US012336954B2

(12) United States Patent
Fazulyanov et al.

(10) Patent No.: US 12,336,954 B2
(45) Date of Patent: Jun. 24, 2025

(54) HYBRID HANDS-FREE CRUTCH

(71) Applicant: EAZISTEP, LLC, Provo, UT (US)

(72) Inventors: Ildar Fazulyanov, Lehi, UT (US); Joshua Vanderpool, Provo, UT (US)

(73) Assignee: EAZISTEP, LLC, Provo, UT (US)

( * ) Notice: Subject to any disclaimer, the term of this patent is extended or adjusted under 35 U.S.C. 154(b) by 159 days.

(21) Appl. No.: 18/159,439

(22) Filed: Jan. 25, 2023

(65) Prior Publication Data

US 2023/0233398 A1 Jul. 27, 2023

Related U.S. Application Data

(60) Provisional application No. 63/303,427, filed on Jan. 26, 2022.

(51) Int. Cl.

*A61H 3/02* (2006.01)
*A61H 3/04* (2006.01)
*A61H 3/00* (2006.01)

(52) U.S. Cl.

CPC ................. *A61H 3/02* (2013.01); *A61H 3/04* (2013.01); *A61H 2003/005* (2013.01); *A61H 2003/007* (2013.01)

(58) Field of Classification Search

CPC .................................... A61H 3/02; A61H 3/04
See application file for complete search history.

(56) References Cited

U.S. PATENT DOCUMENTS

| | | | | | |
|---|---|---|---|---|---|
| 3,986,502 | A * | 10/1976 | Gilson | A61H 3/00 | 135/84 |
| 4,867,188 | A * | 9/1989 | Reid | A61H 3/04 | 482/68 |
| 5,300,016 | A | 4/1994 | Marlatt | | |
| 7,303,537 | B1 * | 12/2007 | Snyder | A61F 3/00 | 135/74 |
| 7,600,524 | B2 * | 10/2009 | West | A61H 3/02 | 135/69 |
| 7,780,180 | B2 | 8/2010 | Hoepner et al. | | |
| 7,959,545 | B2 | 6/2011 | Olexenko | | |
| 8,257,291 | B2 | 9/2012 | Kazerooni et al. | | |
| 8,348,288 | B1 | 1/2013 | Laughon | | |
| 8,523,211 | B2 | 9/2013 | Mailahn | | |
| 8,608,184 | B2 | 12/2013 | Janis et al. | | |
| 8,844,548 | B2 | 9/2014 | Soletski et al. | | |
| 9,375,377 | B1 | 6/2016 | Edwards | | |
| 9,408,443 | B2 | 8/2016 | Hunter | | |
| 9,808,392 | B2 | 11/2017 | Haider et al. | | |
| 10,092,475 | B2 | 8/2018 | Smith | | |
| D838,054 | S | 1/2019 | Franson et al. | | |
| 10,441,493 | B2 | 10/2019 | Adams et al. | | |

(Continued)

OTHER PUBLICATIONS

"FlexLeg: Mobility Redefined", retrieved from https://mobile.twitter.com/flexleg on Jan. 25, 2023, 1 page.

(Continued)

*Primary Examiner* — Noah Chandler Hawk
(74) *Attorney, Agent, or Firm* — Workman Nydegger

(57) ABSTRACT

Disclosed are embodiments for a walking assist device. The device may be capable of transformation into a knee scooter configuration and a hands-free crutch configuration for walking or standing while freeing the hands. The device may also include an elastic member for decreasing the load rate of the device.

17 Claims, 5 Drawing Sheets

(56) References Cited

U.S. PATENT DOCUMENTS

| | | | |
|---|---|---|---|
| 10,617,591 B1 | 4/2020 | Neville et al. | |
| 10,624,810 B2 | 4/2020 | Hunter | |
| 10,717,491 B1 | 7/2020 | Neville et al. | |
| 10,898,403 B2 | 1/2021 | Auger et al. | |
| 10,932,984 B2 * | 3/2021 | Mahathalagalage .... | F16D 49/04 |
| 11,311,449 B1 | 4/2022 | Razon | |
| 11,370,504 B2 | 6/2022 | Evans et al. | |
| 11,452,663 B2 | 9/2022 | Jernigan | |
| 11,517,493 B1 | 12/2022 | Tang et al. | |
| 2007/0182116 A1 | 8/2007 | Davey et al. | |
| 2007/0216122 A1 * | 9/2007 | Cornelius ................ | A61H 3/04<br>280/87.05 |
| 2007/0251560 A1 | 11/2007 | Moore | |
| 2013/0226058 A1 * | 8/2013 | Sanders ............... | A61H 3/0277<br>602/23 |
| 2015/0142134 A1 | 5/2015 | Sanders | |
| 2017/0165146 A1 | 6/2017 | Franson et al. | |
| 2020/0222267 A1 | 7/2020 | Hunter | |
| 2021/0315767 A1 | 10/2021 | Schlagheck et al. | |
| 2022/0125663 A1 | 4/2022 | Greenhalgh | |

OTHER PUBLICATIONS

"RollerFoot Hands Free Knee Walker", retrieved from https://www.rehabmart.com/product/rollerfoot-knee-walker-2217.html on Jan. 25, 2023, 1 page.

"Stryder Hybrid Crutch Can Perform as a Knee Scooter", retrieved from https://www.tuvie.com/stryder-hybrid-crutch-can-perform-as-a-knee-scooter/ on Jan. 25, 2023, 4 pages.

"Swingo Walking Aid", retrieved from https://www.behance.net/gallery/3187049/SWINGO-Walking-Aid on Jan. 25, 2023, 4 pages.

"Lower Limb Prosthetic Sockets and Suspension Systems", retrieved from https://www.physio-pedia.com/Lower_Limb_Prosthetic_Sockets_and_Suspension_Systems on Jan. 15, 2023, 13 pages.

* cited by examiner

HYBRID HANDS-FREE CRUTCH

CROSS-REFERENCE TO RELATED APPLICATIONS

This application claims the benefit of and priority to U.S. Provisional Patent Application Ser. No. 63/303,427 filed on Jan. 26, 2022 and entitled "High-Energy, Hands-Free Crutch," which is expressly incorporated herein by reference.

FIELD OF THE DISCLOSURE

The present disclosure relates to assisted walking devices, including hands-free crutches and knee scooters.

BACKGROUND

Standard axillary crutches are one of the most common devices utilized by those with leg injuries. While relatively easy to use and balance, standard axillary crutches have significant disadvantages in that regular use induces pain in the hands and armpits. Utilizing axillary crutches requires the irregular movement of the body, leading to pain in the feet, knees, and hips. Additionally, traveling relatively longer distances with axillary crutches may be difficult or exhausting.

Alternative devices with distinct advantages over the axillary crutch have been developed for those with lower leg (i.e., the portion of the leg at or below the knee) injuries, including knee scooters and hands-free crutches. Knee scooters have the advantage in that relatively less effort is needed to move across distances. Little movement of the injured leg is required, and less contact is made between the arms and the device when compared to standard axillary crutches. The user can glide on a knee scooter, conserving energy and resulting in less fatigue.

Hands-free crutches allow those with lower leg injuries to stand and walk without occupying their hands. Hands-free crutches also allow the user to exercise the upper leg (i.e., the part of the leg at or above the knee) while walking, leading to decreased muscle atrophy in the upper leg while the leg is healing. There are also benefits to the lower leg, including improved blood flow, less muscle atrophy, and decreased loss of balance and proprioception. Hands-free crutches also have a smaller profile compared to knee scooters, making them easier to maneuver in small spaces.

SUMMARY

Disclosed are embodiments of a walking assist device that may be transformed into a crutch configuration or a knee scooter configuration. The device comprises a lower leg support, a frame, a foot member, and two or more wheels, including at least one forward wheel and at least one rear wheel. While in the crutch configuration the device functions as a hands-free crutch, during which the foot member is positioned at a lowest surface of the device, relative to a ground surface, such that the foot member makes contact with the ground surface during use of the device. While in the knee scooter configuration, the two or more wheels are disposed at a lowest surface of the device, relative to a ground surface, the wheels making contact with the ground surface during use of the device, and the foot member is disposed in a position above a lowest surface of the wheels.

Also disclosed are embodiments of a walking assist device that reduces the loading rate during operation of the device. The device includes a lower leg support, a frame, and an elastic member. The device may also be operated while walking without the use of hands.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

Various objects, features, characteristics, and advantages of the invention will become apparent and more readily appreciated from the following description of the embodiments, taken in conjunction with the accompanying drawings and the appended claims, all of which form a part of this specification. In the Drawings, like reference numerals may be utilized to designate corresponding or similar parts in the various Figures, and the various elements depicted are not necessarily drawn to scale, wherein:

DETAILED DESCRIPTION

Despite advantages over the standard auxiliary crutch, the inventors have identified distinct disadvantages and shortcomings of knee-scooters and the hands-free crutch. Knee scooters are most effective on flat smooth terrain and require the user's hands. They have difficulty navigating rocky or uneven terrain and are not well formed for climbing or descending stairs. Because the injured leg of the user of a knee scooter is largely stationary during movement, the quadriceps, hamstrings, and hip flexors tend to atrophy.

Hands-free crutches are fastened to the injured leg to prevent the knee from flexing or extending. While walking on a healthy uninjured leg, the knee is flexed as the heel of the foot contacts the ground. This flexion of the knee slows the descent of the user as the user places the full weight of the body on the leg. In contrast, the knee of a user of a hands-free crutch is prevented from flexing, resulting in an altered irregular walking gait by the user. This tends to impart sudden jolting forces to the leg during ambulation and decreases the time over which the leg assumes the full load of the user's weight, effectively increasing the loading rate of the injured leg. An irregular gait also makes the user more prone to pain and injury. Additionally, previous embodiments of hands-free crutches and knee scooters have placed the weight of the user on the tibial tuberosity and the anterior crest of the tibia of the leg, leading to discomfort and pressure sores.

Accordingly, what is needed is a walking assist device that overcomes disadvantages of the knee scooter and the hands-free crutch. Also needed is a walking assist device with a decreased loading rate. Such a device would greatly contribute to user convenience in navigating multiple types of terrain, decrease the length of recovery periods, reduce the atrophy of muscles in the injured leg, and decrease the pain and fatigue felt by the user.

Figure 1:
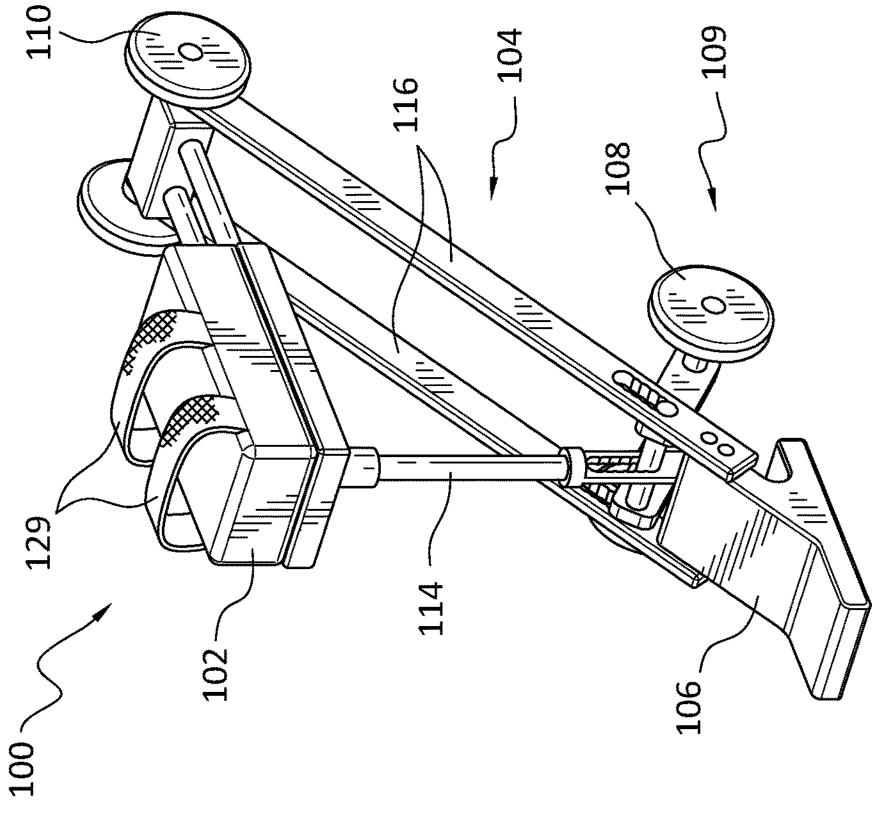
FIG. 1 illustrates an exemplary embodiment of a walking assist device transformed into a hands-free crutch configuration.

Disclosed are embodiments of a hybrid hands-free crutch. One way in which a disclosed device may be considered a hybrid is if the device may assist a user to walk in multiple configurations, including a configuration wherein the device contacts a ground surface at only one location and another configuration wherein the device contacts a ground surface at multiple locations. FIG. 1 illustrates a walking assist device 100 suitable for utilizing one or more features of the present disclosure. The device 100 may aid the ambulation of those with lower leg injuries (i.e., injuries located at or below the knee on the leg of a user), including individuals with foot and ankle injuries. The device may also be used to aid the ambulation of those with physical defects, those who have lost function of at least a portion of the leg, or those where at least a portion of the lower leg has been amputated, though the device may also be used in other contexts.

The illustrated device includes a lower leg support 102, a frame 104, a foot member 106, and four wheels, including two front wheels 108 and two rear wheels 110. The lower leg support 102 is formed for direct contact with the lower leg and provides direct support to the lower leg during use. The lower leg most easily supports forces that are oriented perpendicular to a transverse plane of the leg, while forces oriented lateral to the lower leg may cause discomfort or pain, especially those forces directed at the shin. In preferred embodiments, the lower leg support is formed to limit forces applied directly to the shin.

The lower leg support 102 may comprise a pad or block but is preferably shaped to conform to the lower leg of the user. The form of the lower leg support 102 may be configured to so as to distribute the user's weight to the lateral sides of the user's lower leg and to avoid placing the user's weight on pressure sensitive areas, such as the patella, the tibial tuberosity, the medial and lateral femoral condyles, the fibular head, and the tibial crest of the user's leg. For example, the lower leg support may be formed into a cupping shape, a "V" shape, or other shape such that forces from the device 100 are transferred to pressure tolerant areas of the lower leg, such as the medial and lateral flares of the tibia, the supracondylar areas of the knee, and the patellar tendon. Such configurations of the lower leg support 102 are especially important for minimizing the formation of pressure sores and improving the comfort experienced by a user of the device 100. The lower leg support 102 preferably comprises a soft material such as memory foam, gel, rubber, an air bladder, or other shock-absorbing or pressure-distributing material. The lower leg support 102 may comprise multiple layers. For example, a bottom layer may comprise a high-density support foam for supporting the leg and a top layer may comprise a softer memory foam for direct contact and cushioning of the lower leg.

The lower leg of the user may be secured to the lower leg support 102 to limit opportunity for further injury and to facilitate use of the device 100. The lower leg may be secured to the device 100 through one or more elastic bands 112, as shown in FIG. 1, or through straps, clamps, clasps, buckles, or other securement mechanisms.

Figure 2:
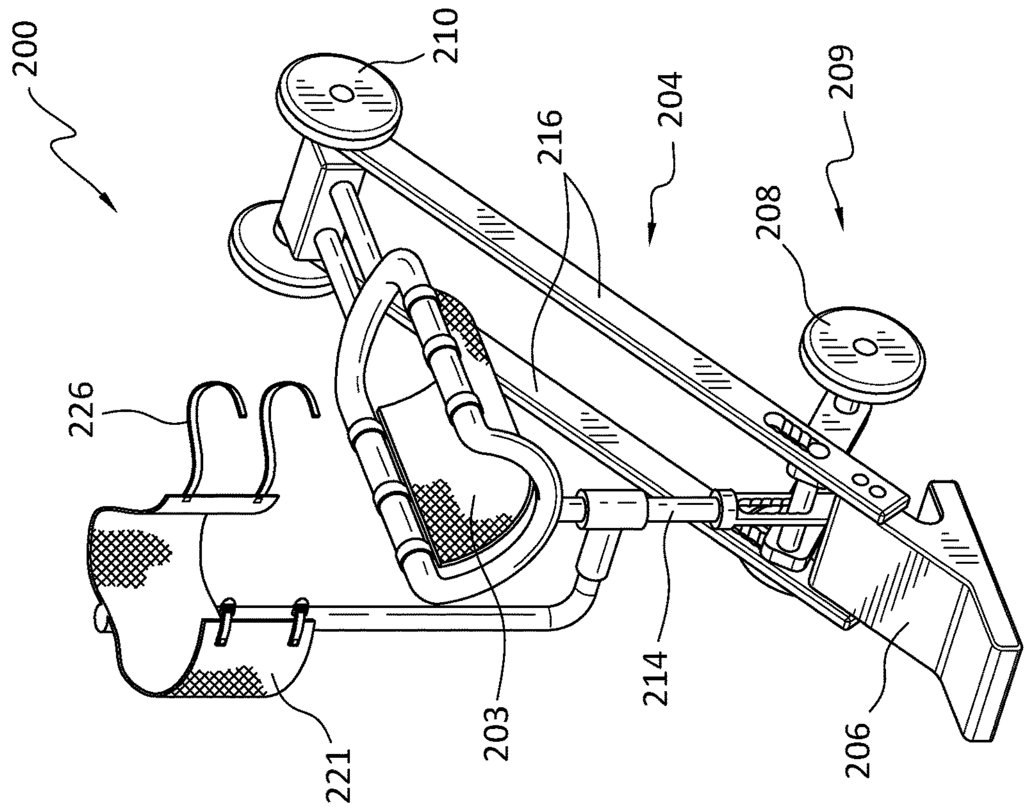
FIG. 2 illustrates an exemplary embodiment of a walking assist device including a sling and an upper leg holder.

The lower leg support 102 may also comprise a sling 203, such as that shown in FIG. 2. In such embodiments, the sling 203 may be configured to freely support the lower leg. Preferably, the sling 203 is configured to support only the weight of the lower leg of the user, and other mechanisms are preferably used to transmit the weight of other portions of the user from the upper leg of the user to the device 200.

The frame 204 may be connected to a bottom surface of the lower leg support 202. The frame 204 may also include a substantially vertical post 214 disposed beneath the knee of the user to transmit the weight of the user through the upper leg and a point at or near knee rather than more distal portions of the lower leg. The frame 204 may also include one or more pivot bars 216 directly or otherwise connected to the front 208 and rear 210 wheels and foot member 206. The front wheels may be incorporated into a front wheel assembly 209 that may pivot in cooperation with the pivot bars 216 and the vertical post 214 to place the front wheels 208 in an elevated position. The frame 204 may include stabilizer bars 218 for adjusting the height of the front 208 and rear 210 wheels and stabilizing the frame 204 in relation to the wheels. The stabilizing bars 218 may comprise extendable members, such as nested telescoping members, or may simply be incorporated or removed from the device 200 for transforming the device 200 into different configurations.

The frame 204 may comprise materials that are sufficiently strong to support the weight of an adult user while maintaining a sufficiently light weight such that the device 200 may be easily maneuvered. Preferred materials include metals and metal alloys, such as aluminum, titanium, and steel, as well as composite materials, such as durable plastics, wood, and carbon fiber. The frame 204 may comprise solid or tubular members. The cross section of the frame members may be circular, square, rectangular, triangular, or other geometric shape.

Figure 3:
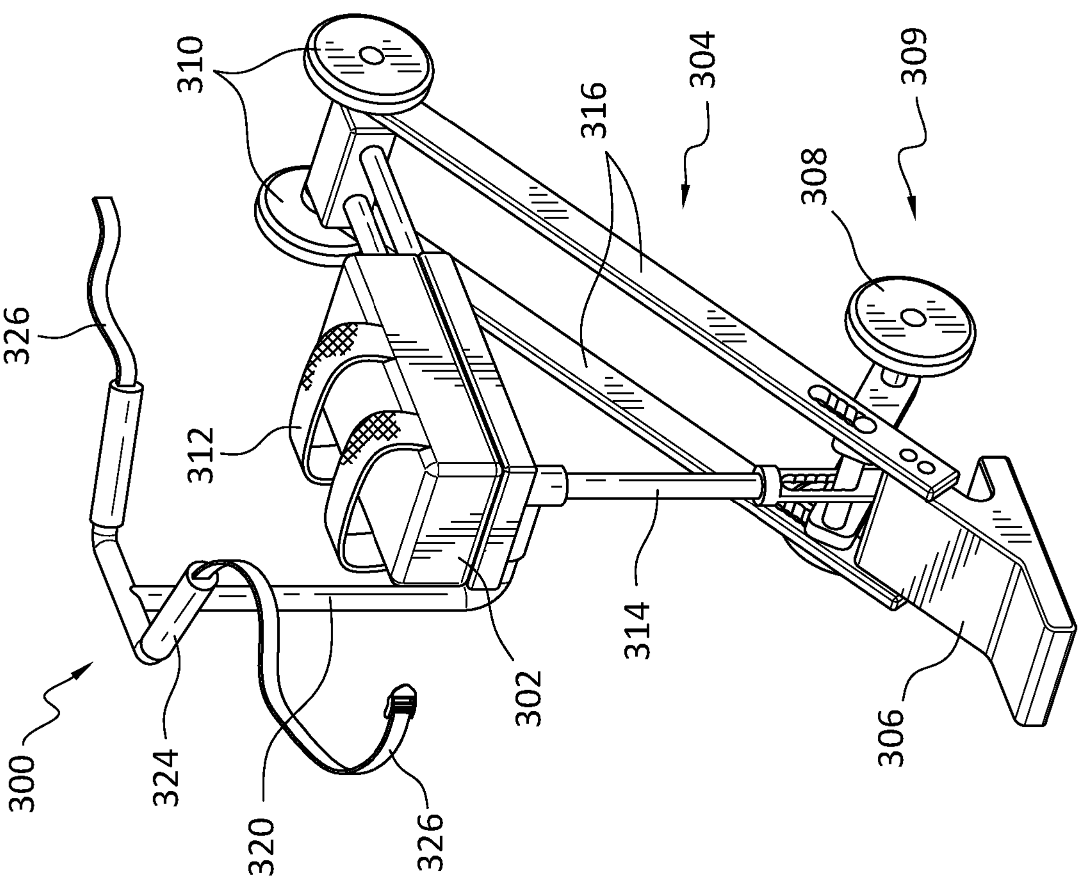
FIG. 3 illustrates an exemplary embodiment of a walking assist device transformed into a hands-free crutch configuration, including a securement member.

FIG. 3 illustrates a device 300 including a securement member 320. The securement member 320 may be connected to the frame 304 or the lower leg support 302 via one or more joints 322. The securement member 320 may include a handle 324 for gripping and/or steering the device 300 during use. The securement member 320 may be fastened to the upper leg of the user for maintaining the position of the device 300 relative to the user and to aid in transmitting the weight of the user to the device 300. The width of the securement member 320 is preferably adjustable to accommodate the width of a user's upper leg. In some embodiments, the securement member 220 may be configured to form an upper leg holder 221, such as that shown in FIG. 2. The upper leg holder 221, may cup the upper leg of a user in a manner similar to a prosthetic sheath and may be configured so as to transmit all or most of a user's weight directly from the upper leg of the user to the device 200.

The upper leg may be fastened to the securement member 320 through one or more straps 326, though clamps, bands, or other securement mechanisms may be used. The straps 326 or other securement mechanisms are preferably removable or capable of being stowed away for convenience while the device 300 is transformed in the crutch configuration. For example, the straps 326 may be connected to the securement member 320 by a retracting mechanism, such that the straps may be retracted and/or concealed during use of the device.

The position of the securement member 320 may be adjustable for different configurations of the device 300. For example, the securement member 320 may be disposed to the medial, lateral, or anterior sides of the user's leg. The joint 322 connecting the securement member 320 to the device 300 may include a hinge or other bending mechanism, allowing the device 300 to bend during rotation of the knee. The joint 322 may include a locking mechanism to prevent flexion or extension of the knee when the upper leg and lower leg are secured to the device 300. The joint 322 may be placed in a locked position within a range of approximately 45 degrees to 140 degrees knee flexion, or preferably 50 degrees to 120 degrees knee flexion, or more preferably 60 degrees to 90 degrees of knee flexion. However, during use of the device 300 the joint 322 is preferably disposed in an unlocked position so that knee flexion may be employed to slow descent of the body during ambulation.

Figure 4:
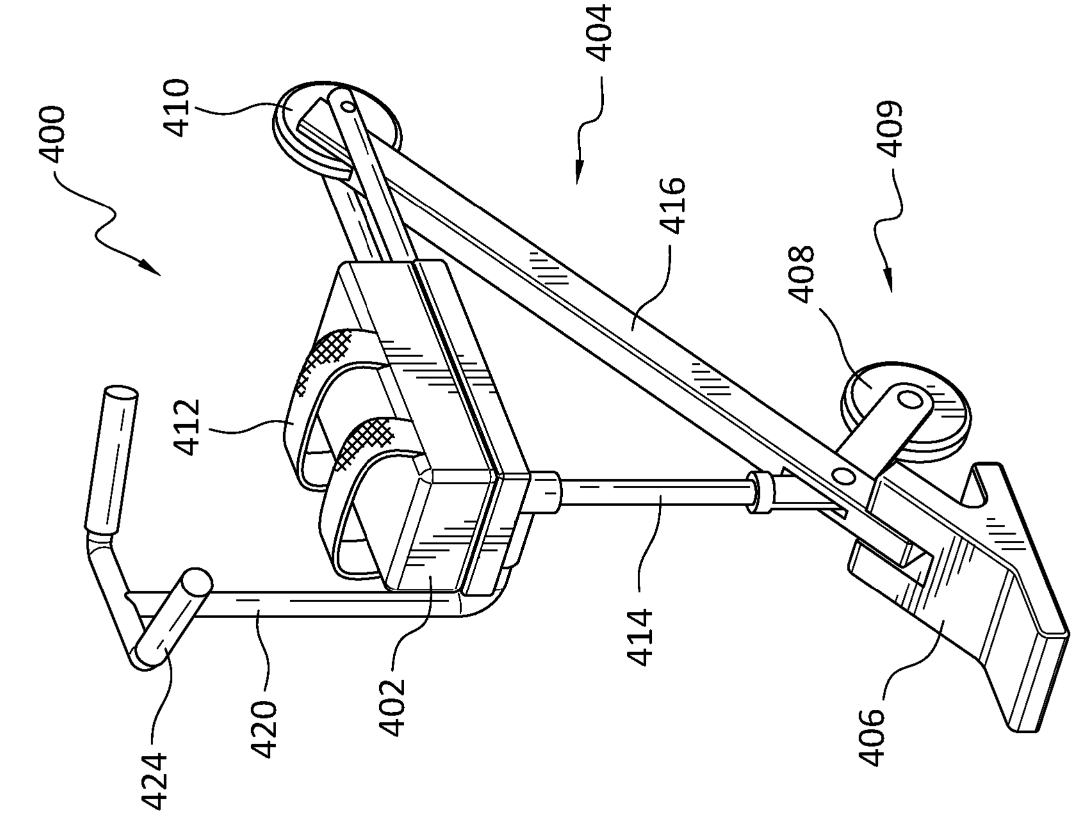
FIG. 4 illustrates an exemplary embodiment of a walking assist device having only two wheels.

The foot member 306 is preferably connected to the frame 304 at or near the bottom of the device 300. As illustrated in FIG. 3, the foot member 306 may be connected at the front end of one or more pivot bars 316 of the frame 304. The illustrated device 300 also includes a front wheel assembly 309, including two front wheels 308, located behind the foot member 306 and hingably connected to the post 314 of the frame 304. In other embodiments, the front wheel assembly 309 may be located in front of or substantially coincident with the foot member 306. Two rear wheels 310 may be positioned at the posterior ends of the one or more pivot bars 316. In other embodiments, such as that shown in FIG. 4, the device 400 may include only one front wheel 408, may include only one back wheel 410, or may include only one front wheel 408 and one back wheel 410. Alternatively, more than two front wheels 408 or more than two rear wheels 410 may be used.

The device 300 may be transformed into multiple configurations, including a hands-free crutch configuration and a knee scooter configuration. On flat terrain, the knee scooter configuration may be preferred for easier travel. However, in cases where terrain is uneven, where the user requires the availability of the hands for another purpose, or where the user desires to exercise the upper leg, a hands-free crutch configuration is preferred.

FIG. 3 illustrates the device 300 transformed in a crutch configuration. While in the crutch configuration the foot member 306 may be disposed in a lowered position by rotating the front end of the one or more pivot bars 316 downward, such that the foot member 306 comes in contact with the ground. The front 308 and rear 310 wheels may be disposed in an elevated position. The securement member 320 may be oriented to one side of the device 300, preferably in a direction towards the lateral side of the user's body, to be more conveniently positioned near the user's hand. For example, the securement member 320 could be oriented to the right side of the device 300 when the device 300 is worn on the right leg. Alternatively, the securement member 320 may be disposed in a forward position, as illustrated in FIG. 5.

Figure 5:
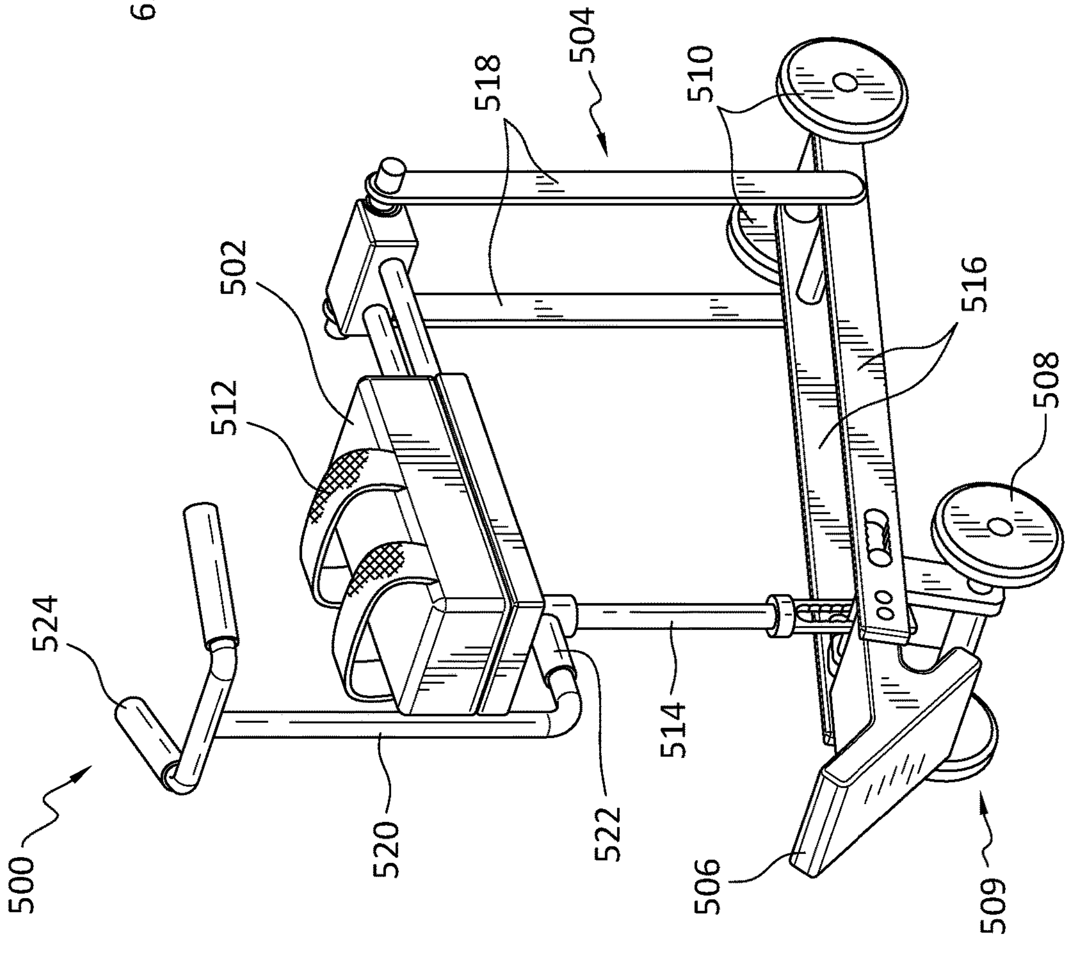
FIG. 5 illustrates an exemplary embodiment of a walking assist device transformed into a scooter configuration.

The device 500 may also take a knee scooter configuration, as shown in FIG. 5. While in the knee scooter configuration, the front end of the one or more pivot bars 516 are rotated upward, lifting the foot member 506 from a lowered position. The foot member 506 is thus prevented from contacting the ground while in the knee scooter configuration. The front 508 and rear 510 wheels are disposed in a lowered position, contacting the ground. Stabilizer bars 518 may connect the pivot bars 516 to other portions of the frame 504. Each stabilizer bar 518 may be connected at or near the rear end of the one or more pivot bars 516. The securement member 520 may be disposed in a forward position and preferably may be used to steer the front wheels 508 of the device 500.

The walking assist device 500 may include an elastic member designed to decrease the load rate of the device 500 during ambulation of the user. The elastic member may also serve to store energy as the weight of the user is placed on the device 500, such that the user receives energy back from the device 500 during walking motions. This decreases the strain on the injured leg and decreases fatigue of the user. The elastic member may be formed from relatively elastic, yet sufficiently stiff materials for supporting the weight of the user. Preferred materials include metals and metal alloys (e.g. steel), durable plastics (e.g., poly propylene, polyvinyl chloride, polyoxymethylene), or composite materials (e.g., carbon fiber).

Figure 6:
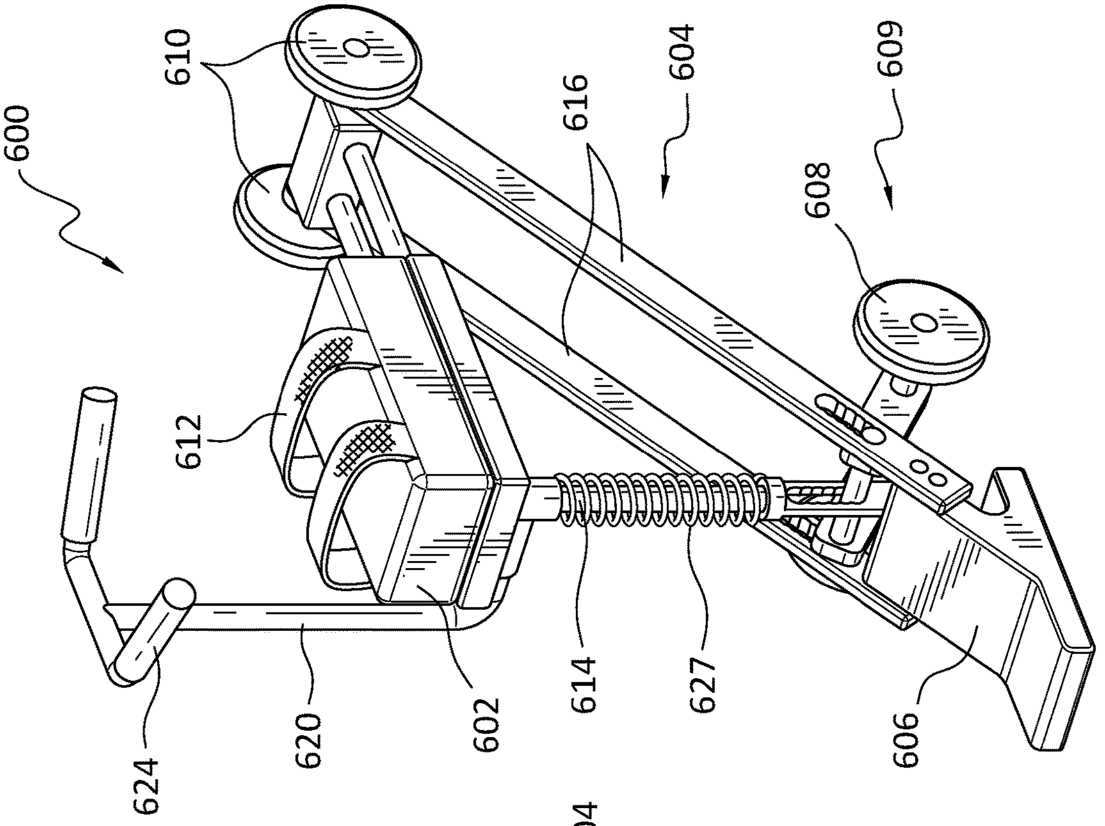
FIG. 6 illustrates an exemplary embodiment of a walking assist device including a coil spring disposed about a post of the frame.

The elastic member may be disposed on or about various locations on the device 500. In some embodiments, the elastic member may comprise a spring, such as a coil spring, as shown in FIG. 6. In such embodiments, the coil spring may be disposed on or about the post 614 of the frame 604. Alternatively, the elastic member may comprise a bow spring 728.

Figure 7:
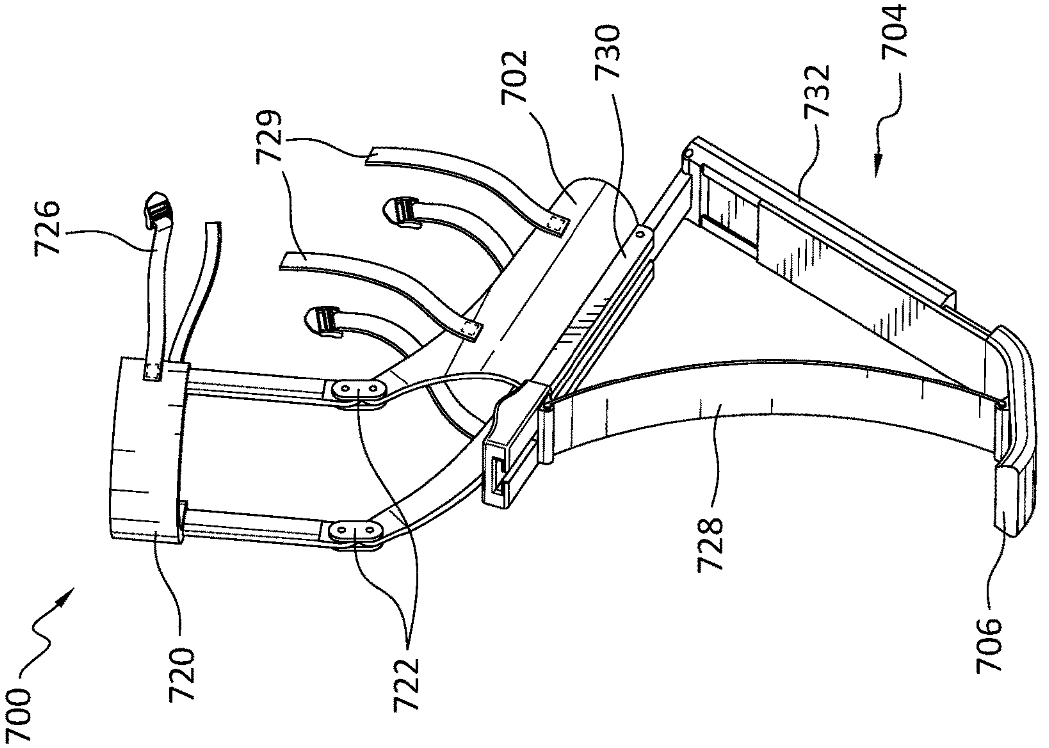
FIG. 7 illustrates an exemplary embodiment of a walking assist device including a bow spring.

FIG. 7 illustrates a walking assist device 700 including a bow spring 728. The illustrated device 700 also includes a lower leg support 702, a frame 704, a foot member 706, and a securement member 720 connected to the device 700 via joints 722. Straps 726 and 729 may be connected to the securement member 720 and the lower leg support 702 to secure the upper leg and lower leg of the user. The frame 704 may comprise an upper member 730 hingably connected to a lower member 732. The upper member 730 and lower member 732 of the frame 704 may be extendable such that the height of the device 700 may be adjusted to accommodate users of different heights. The upper member 730 and lower member 732 of the frame 704 may each include an extension mechanism, such as members that are slidably connected, nested telescoping members, or modular members that may be incorporated into the frame 704.

A foot member 706 may be connected to the lower member 732 of the frame 704. The bow spring 728, which may be connected to the foot member 706, may also be slidably connected to the bottom surface of the upper member 730 of the frame 704 for adjusting the position of the bow spring 728 along the bottom surface of the upper member 730. Thus, the height of the device 700 may be adjusted by extension of the upper member 730 and lower member 732 of the frame 704 and the position of the bow spring 728 along the upper member 730.

During ambulatory motions, the bow spring 728 is bent as the weight of the user is placed on the device 700. Because the force required to compress a spring increases with displacement of an end of the spring, the force the bow spring 728 exerts on the user increases as the bow spring 728 bends and supports the weight of the user. This results in a longer load time compared to a device 700 without an elastic member, resulting in a decreased load rate.

Figure 8:
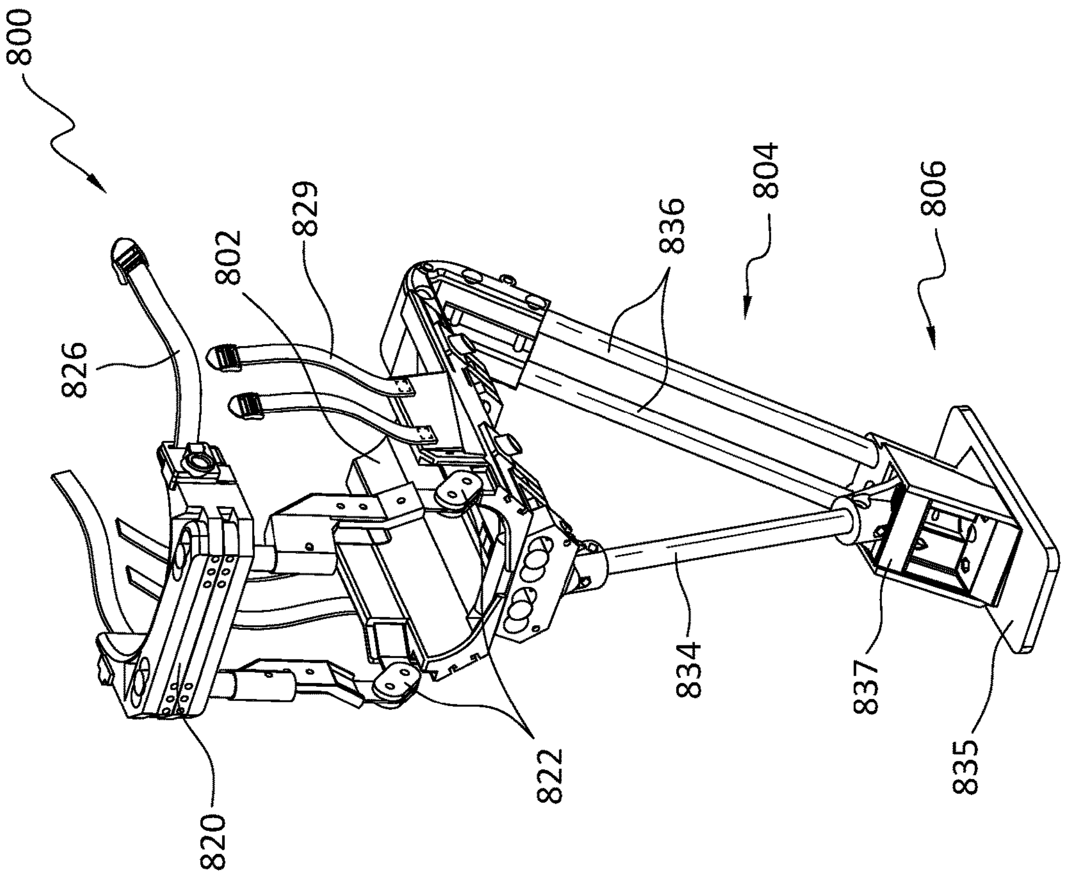
FIG. 8 illustrates an exemplary embodiment of a walking assist device including an elastic foot member.

In other embodiments, the foot member 706 may comprise the elastic member. FIG. 8 illustrates an exemplary embodiment of the device 800, including a lower leg support 802, a frame 804, a foot member 806, a securement member 820 connected to the lower leg support 802 via two joints 822, and straps 826 and 829 for securing the upper leg and lower leg of the user to the device 800. The frame 804 of the device 800 shown in FIG. 8 includes a front post 834 and two rear posts 836. The front 834 and rear 836 posts may be extendable to adjust for the height of a user. In some embodiments, the rear posts 836 may be manipulated for larger gross height adjustments and the front post 834 may be manipulated for finer height adjustments of the device 800.

FIG. 8 also illustrates a foot member 806 comprising an elastic member. The foot member 806 may comprise a contact strip 835 and a connector portion 837 for connecting the contact strip 835 to the frame 804.

The contact strip 835 may be formed from elastic materials, such as carbon fiber embedded in epoxy, such that the contact strip 835 may flex as it contacts the ground during walking movements, decreasing the loading rate. The contact strip 835 and connector portion 837 may be modular to enable customization for the height and weight of a user. Particularly, the device 800 may accommodate the weight of the user by selecting a contact strip 835 and/or connector portion 837 with optimal flexibility for the desired load rate. For example, the flexibility and stiffness of the contact strip 835 may be adjusted by selecting a contact strip that includes materials of the desired flexibility. The device 800 may also include one of several contact strip 835 or connector portion 837 geometries for further adjusting the flexibility of the foot member 806.

Figure 9:
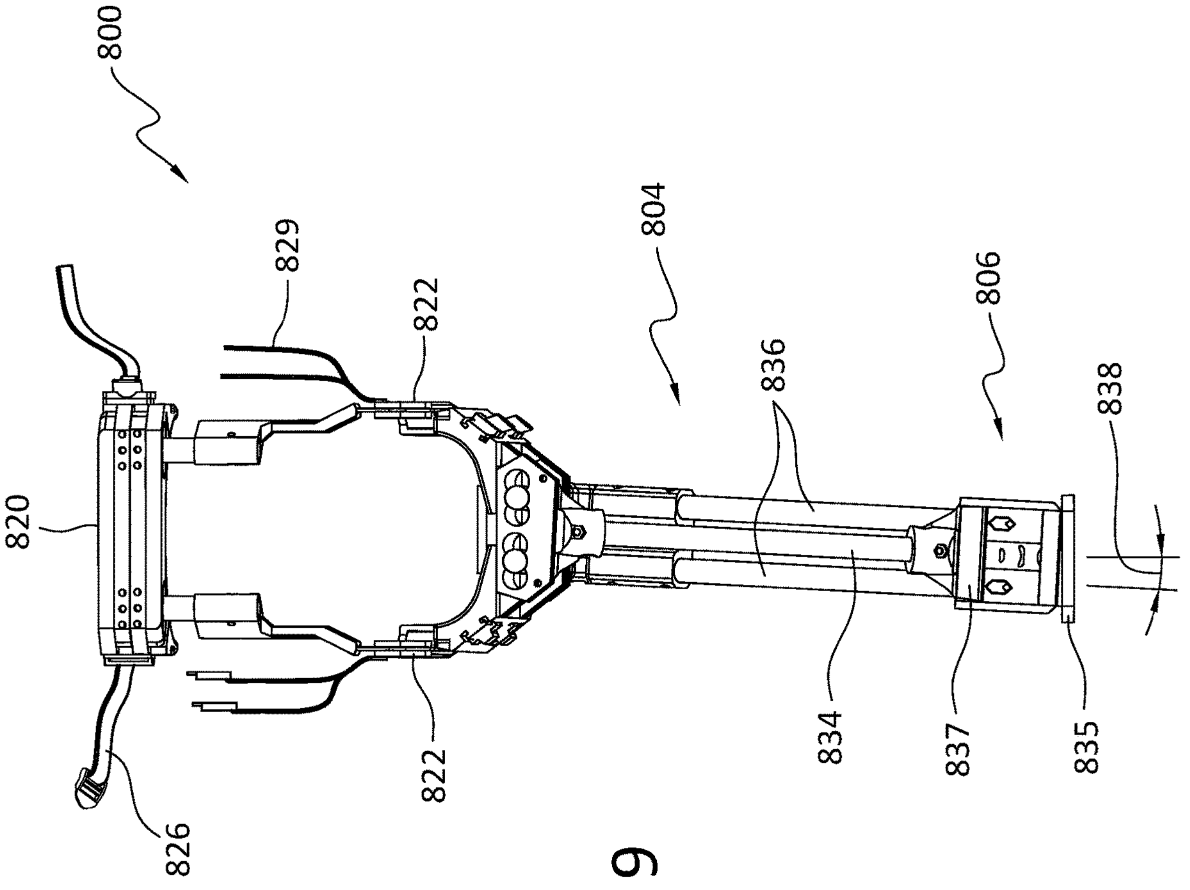
FIG. 9 illustrates a front view of an exemplary embodiment of a walking assist device with the foot member disposed at a quadriceps angle relative to the lower leg support of the device.

The frame 804 and foot member 806 may extend at an angle from the upper leg of the user to produce a quadriceps angle (Q-angle) 838, such that when the device 800 is properly secured to the leg of the user, the foot member 806 is offset to one side rather than placed directly beneath the user's knee. FIG. 9 illustrates a device 800 wherein the frame 804 and foot member 806 extend at an angle from the lower leg support 802 to form a Q-angle 838.

The Q-angle 838 can be measured as the angle between a line through the center of the patella to the anterior superior iliac spine and a line from the center of the patella to a center point on the bottom surface of the foot member 806. The device 800 may be set at a Q-angle 838 that resembles the Q-angle 838 of a healthy adult. The range of angles include between approximately 0 degrees and approximately 30 degrees, preferably between approximately 4 degrees and approximately 26 degrees, or more preferably between approximately 8 degrees and approximately 22 degrees, or more preferably between approximately 12 degrees and approximately 18 degrees, or the endpoints thereof. In some embodiments, the Q-angle 838 of the device 800 may be adjustable within the ranges disclosed above.

The device 800 may include a Q-angle 838 wherein the foot member 806 is disposed lateral of the user's knee to form a valgus angle. Alternatively, the device 800 may include a Q-angle 838 wherein the foot member 806 is disposed medial of the user's knee to form a varus angle. A Q-angle 838 present in the device 800 may also be beneficial in cases where the device 800 slips against the ground or misplacement of the foot member 806, as the Q-angle 838 may encourage the user to fall back to a user's other leg, which presumably may be uninjured and where presumably the user may have greater control.

The foot member 806 may be adjustable to accommodate the Q-angle 838 of the device 800, such that a bottom surface of the foot member 806 may be oriented substantially parallel to a level ground surface. The foot member 806 may also include an adjustment mechanism such that the bottom surface of the foot member 806 may be automatically oriented substantially parallel to a ground surface given a Q-angle 838. This adjustment mechanism may also allow the device 800 to be more stable in uneven terrain, the foot member 806 automatically adjusting to a stable position.

While certain embodiments of the present disclosure have been described in detail, with reference to specific configurations, parameters, components, elements, etcetera, the descriptions are illustrative and are not to be construed as limiting the scope of the claimed invention.

Furthermore, it should be understood that for any given element of component of a described embodiment, any of the possible alternatives listed for that element or component may generally be used individually or in combination with one another, unless implicitly or explicitly stated otherwise.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

Any headings and subheadings used herein are for organizational purposes only and are not meant to be used to limit the scope of the description or the claims.

It will also be noted that, as used in this specification and the appended claims, the singular forms "a," "an" and "the" do not exclude plural referents unless the context clearly dictates otherwise. Thus, for example, an embodiment referencing a singular referent (e.g., "widget") may also include two or more such referents.

It will also be appreciated that embodiments described herein may also include properties and/or features (e.g., ingredients, components, members, elements, parts, and/or portions) described in one or more separate embodiments and are not necessarily limited strictly to the features expressly described for that particular embodiment. Accordingly, the various features of a given embodiment can be combined with and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include such features.

The invention claimed is:

1. A walking assist device comprising:

a lower leg support coupled to a frame;

a foot member coupled to the frame;

two or more wheels, including at least one forward wheel and at least one rear wheel; and a securement member configured to secure a leg of a user to the frame and/or to the lower leg support, wherein the device is configured to be arranged into two or more configurations, including a crutch configuration wherein the foot member is configured to make contact with a ground surface; and a knee scooter configuration wherein the two or more wheels are configured to make contact to a ground surface, wherein in the crutch configuration the device is a hands-free device that enables the user to stand and/or walk without occupying a hand of the user, wherein the walking assist device further comprises a handle for gripping and/or steering the device in the knee scooter configuration, wherein at least part of the handle contacts the leg of the user when in the crutch configuration, and wherein the handle becomes at least part of the securement member in the crutch configuration.

2. The device of claim 1, wherein the securement member includes retractable straps.

3. The device of claim 1, wherein the securement member includes the handle.

4. The device of claim 3, wherein the securement member is connected to the device by a steering mechanism.

5. The device of claim 1, wherein the securement member comprises one or more securement mechanisms, and wherein the device is configured to be fastened to a lower leg portion of the leg by the one or more securement mechanisms comprising a strap, band, clamp, or other fastener.

6. The device of claim 1, wherein the lower leg support further comprises a soft supportive material and/or a memory foam.

7. The device of claim 1, wherein the lower leg support comprises multiple layers.

8. The device of claim 1, wherein the lower leg support is configured to minimize the transmission of forces to pressure sensitive areas of a lower leg of a user.

9. The device of claim 1, wherein the foot member comprises an elastic material.

10. The device of claim 1, further comprising an elastic member.

11. The device of claim 10, wherein the elastic member comprises a spring coil.

12. The device of claim 1, wherein the foot member is positioned at a quadriceps angle relative to an upper leg of a user of the device within a range of approximately 0 degrees and approximately 30 degrees, or between approximately 4 degrees and approximately 26 degrees, or between approximately 8 degrees and approximately 22 degrees, or between approximately 12 degrees and approximately 18 degrees, or the endpoints thereof.

13. The device of claim 12, wherein the quadriceps angle is adjustable within a range of approximately 0 degrees and approximately 30 degrees, or between approximately 4 degrees and approximately 26 degrees, or between approximately 8 degrees and approximately 22 degrees, or between approximately 12 degrees and approximately 18 degrees, or the endpoints thereof.

14. The device of claim 1, wherein the lower leg support comprises a sling.

15. The device of claim 1, wherein a position of the securement member is adjustable.

16. The device of claim 1, wherein the securement member is configured to secure the upper leg of the user to the device.

17. The device of claim 1, wherein at least part of the handle contacts a lateral portion of the leg of the user when in the crutch configuration.

* * * * *